US012804275B2

(12) United States Patent
Naganuma et al.

(10) Patent No.: US 12,804,275 B2
(45) Date of Patent: Nov. 17, 2026

(54) ELECTRONIC DEVICE, INFORMATION PROCESSING METHOD, AND PROGRAM

(71) Applicant: Sony Interactive Entertainment Inc., Tokyo (JP)

(72) Inventors: Hiromasa Naganuma, Tokyo (JP); Masakazu Hayashi, Tokyo (JP); Naoki Egawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 49 days.

(21) Appl. No.: 18/730,332

(22) PCT Filed: Jan. 28, 2022

(86) PCT No.: PCT/JP2022/003405
§ 371 (c)(1),
(2) Date: Jul. 19, 2024

(87) PCT Pub. No.: WO2023/145019
PCT Pub. Date: Aug. 3, 2023

(65) Prior Publication Data
US 2025/0150727 A1 May 8, 2025

(51) Int. Cl.
*H04N 25/47* (2023.01)
*G01C 21/16* (2006.01)
*G06T 7/269* (2017.01)

(52) U.S. Cl.
CPC ......... *H04N 25/47* (2023.01); *G01C 21/1656* (2020.08); *G06T 7/269* (2017.01)

(58) Field of Classification Search
None
See application file for complete search history.

(56) References Cited

U.S. PATENT DOCUMENTS 10,812,711 B2 * 10/2020 Sapienza .............. H04N 23/684
2017/0089948 A1 * 3/2017 Ho ...................... G01C 25/005
(Continued)

FOREIGN PATENT DOCUMENTS

CN 110296717 A 10/2019
EP 3779864 A1 2/2021
(Continued)

OTHER PUBLICATIONS

EP22923883.7, "Extended European Search Report", Oct. 28, 2025, 7 pages.
(Continued)

*Primary Examiner* — Twyler L Haskins
*Assistant Examiner* — Esley J Chiu
(74) *Attorney, Agent, or Firm* — Kilpatrick Townsend & Stockton LLP

(57) ABSTRACT

Provided is an electronic device including an event-driven vision sensor including a sensor array having a sensor that generates an event signal when detecting a change in the intensity of incident light, an IMU whose positional relation with the vision sensor is known and which measures at least one physical quantity, and an additional information generating section that generates additional information related to the event signal or an output value of the IMU by associating flow information detected on the basis of the event signal with a flow pattern associated in advance with the at least one physical quantity or an estimated value based on the at least one physical quantity.

12 Claims, 8 Drawing Sheets

(56) References Cited

U.S. PATENT DOCUMENTS

| | | | | |
|---|---|---|---|---|
| 2019/0273909 | A1* | 9/2019 | Ye | G06T 7/579 |
| 2020/0013173 | A1* | 1/2020 | Lee | G06T 7/269 |
| 2020/0404177 | A1 | 12/2020 | Sapienza et al. | |
| 2022/0046222 | A1* | 2/2022 | Meier | G01S 17/86 |
| 2022/0114757 | A1* | 4/2022 | Zhou | G01C 21/1656 |
| 2022/0172375 | A1* | 6/2022 | Seo | H04N 25/46 |
| 2022/0299543 | A1* | 9/2022 | Carlson | G01C 21/1656 |

FOREIGN PATENT DOCUMENTS

| | | | |
|---|---|---|---|
| JP | 2008185506 | A | 8/2008 |
| JP | 2014-535098 | A | 12/2014 |
| JP | 2018-085725 | A | 5/2018 |
| JP | 2020-057990 | A | 4/2020 |
| JP | 2020-091163 | A | 6/2020 |
| JP | 2021520155 | A | 8/2021 |
| WO | 2020/110659 | A1 | 6/2020 |
| WO | 2020163663 | A1 | 8/2020 |
| WO | 2021117639 | A1 | 6/2021 |

OTHER PUBLICATIONS

Aerts, et al., "Time Synchronisation of Low-cost Camera Images with IMU Data based on Similar Motion", Proceedings of the 16th International Conference on Informatics in Control, Automation and Robotics, Jul. 29, 2019, pp. 292-299.

Delbruck, et al., "Integration of Dynamic Vision Sensor with Inertial Measurement Unit for Electronically Stabilized Event-Based Vision", Institute of Electrical and Electronics Engineers, Institute of Neuroinformatics, University of Zurich and ETH, International Symposium on Circuits and Systems (ISCAS), Jun. 1, 2014, pp. 2636-2639.

Mair, et al., "Spatio-Temporal Initialization for IMU to Camera Registration", Robotics and Biomimetics (Robio), Institute of Electrical and Electronics Engineers International Conference, Proceedings of the 2011 IEEE International Conference on Robotics and Biometrics, Dec. 7, 2011, pp. 557-564.

Vidal, et al., "Ultimate LAM? Combining Events, Images, and IMU for Robust Visual SLAM in HDR and High Speed Scenarios", IEEE, Institute of Electrical and Electronics Engineers Robotics and Automation Letters, Library Cornell University Ithaca, 201 Olin Library Cornell University Ithaca, Sep. 19, 2017, 10 pages.

JP2023-576535, "Notice of Allowance", Sep. 30, 2025, 3 pages.

International Search Report and Written Opinion mailed on Mar. 29, 2022, received for International Application No. PCT/JP2022/003405, filed on Jan. 28, 2022, 08 pages including English Translation.

* cited by examiner

ELECTRONIC DEVICE, INFORMATION PROCESSING METHOD, AND PROGRAM

CROSS-REFERENCE TO RELATED APPLICATION

The present application is a national stage application, pursuant to 35 U.S.C. § 371, of International Patent Application No. PCT/JP2022/003405, filed Jan. 28, 2022, the entire contents of which are incorporated herein by reference.

TECHNICAL FIELD

The present invention relates to an electronic device, an information processing method, and a program.

BACKGROUND ART

There are known event-driven vision sensors in which pixels having detected changes in the intensity of incident light generate signals in a time-asynchronous manner. Event-driven vision sensors have an advantage of being able to operate with low power and at high speed compared to frame-type vision sensors that scan all pixels at predetermined intervals, specifically image sensors such as a charge coupled device (CCD) and a complementary metal oxide semiconductor (CMOS). Techniques related to such event-driven vision sensors are described in PTL 1 and PTL 2, for example.

CITATION LIST

Patent Literature

PTL 1

Japanese Translations of PCT for Patent No. 2014-535098

PTL 2

Japanese Patent Laid-open No. 2018-85725

SUMMARY

Technical Problem

However, although the above-mentioned advantage of event-driven vision sensors are known, it is hard to say that peripheral technologies for which characteristics different from those of conventional vision sensors, such as frame-type vision sensors, are taken into account have been sufficiently proposed.

Therefore, an object of the present invention is to provide an electronic device, an information processing method, and a program that make it possible to generate useful information by use of an event-driven vision sensor and an inertial measurement unit (IMU).

Solution to Problem

According to one aspect of the present invention, there is provided an electronic device including a vision sensor that is of an event-driven type and includes a sensor array having a sensor that generates an event signal when detecting a change in an intensity of incident light, an IMU whose positional relation with the vision sensor is known and which measures at least one physical quantity, and an additional information generating section that generates additional information related to the event signal or an output value of the IMU by associating flow information detected on the basis of the event signal with a flow pattern associated in advance with the at least one physical quantity or an estimated value based on the at least one physical quantity.

According to another aspect of the present invention, there is provided an information processing method including a step of generating additional information related to an event signal or an output value of an IMU by associating flow information detected on the basis of the event signal received from a vision sensor that is of an event-driven type and includes a sensor array having a sensor that generates the event signal when detecting a change in an intensity of incident light with a flow pattern associated in advance with at least one physical quantity measured by the IMU whose positional relation with the vision sensor is known or an estimated value based on the at least one physical quantity.

According to still another aspect of the present invention, there is provided a program that causes a computer to implement a function of generating additional information related to an event signal or an output value of an IMU by associating flow information detected on the basis of the event signal received from a vision sensor that is of an event-driven type and includes a sensor array having a sensor that generates the event signal when detecting a change in an intensity of incident light with a flow pattern associated in advance with at least one physical quantity measured by the IMU whose positional relation with the vision sensor is known or an estimated value based on the at least one physical quantity.

DESCRIPTION OF EMBODIMENTS

Hereinafter, some embodiments of the present invention will be described in detail with reference to the accompanying drawings. Note that, in the present description and the drawings, components having substantially the same functional configuration are designated by the same reference signs and redundant description will be omitted.

First Embodiment

Figure 1:
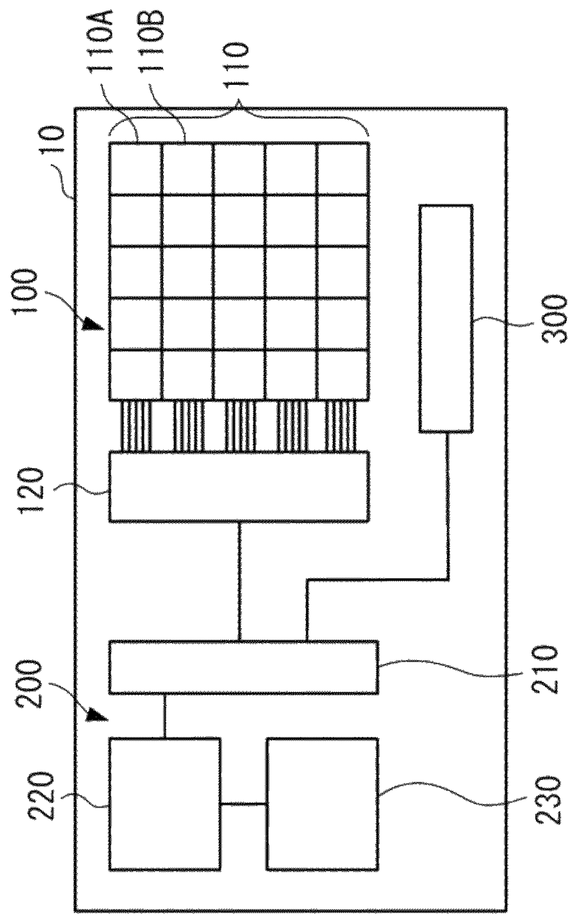
FIG. 1 is a block diagram illustrating a schematic configuration of an electronic device according to a first embodiment of the present invention.

FIG. 1 is a block diagram illustrating a schematic configuration of an electronic device according to a first embodiment of the present invention. As illustrated in FIG. 1, an electronic device 10 includes a vision sensor 100, a control unit 200, and an IMU 300.

The event-driven vision sensor 100 includes a sensor array 110 having sensors 110A, 110B, corresponding to pixels of an image, and a processing circuit 120 connected to the sensor array 110. The sensors 110A, 110B, . . . include light receiving elements, and generate event signals when detecting a change in the intensity of incident light, more specifically, a change in brightness. The event signal is output from the processing circuit 120 as information indicating, for example, a time stamp, sensor identification information (the pixel position, for example), and the polarity of the brightness change (increase or decrease). When a subject moves within the angle of view of the sensor array 110, the intensity of light reflected or scattered by the subject changes, and therefore, the movement of the subject can be detected in chronological order by event signals generated by the sensors 110A, 110B, . . . corresponding to the edge of the subject, for example.

The control unit 200 includes a communication interface 210, a processing circuit 220, and a memory 230. The communication interface 210 receives event signals transmitted from the processing circuit 120 of the vision sensor 100 and output values such as acceleration and angular velocity transmitted from the IMU 300, and outputs these to the processing circuit 220. The processing circuit 220 operates according to a program stored in the memory 230, for example, and processes the received event signal and output value. For example, on the basis of the event signal, the processing circuit 220 generates, in time series, an image in which the position where the brightness change has occurred is mapped, and temporarily or continuously stores the image in the memory 230 or further transmits the image to another device via the communication interface 210. Further, for example, the processing circuit 220 estimates the posture angle and displacement of the electronic device 10 by integrating the acceleration and angular velocity obtained as the output value of the IMU 300.

The IMU 300 measures at least one physical quantity. To be more specific, the IMU 300 includes a gyro sensor and an acceleration sensor, and detects the angular velocity and acceleration generated in the electronic device 10, for example. The angular velocity and acceleration are examples of physical quantities. Here, the positional relation between the IMU 300 and the vision sensor 100 is known. To be specific, for example, the posture angle and displacement estimated on the basis of the output value of the IMU 300 can be considered to be the same as the posture angle and displacement of the vision sensor 100, or can be converted into the posture angle and displacement of the vision sensor 100 by geometric calculation. When displacement or rotation occurs in the electronic device 10, the IMU 300 detects angular velocity and acceleration, and since the positional relation between the sensors 110A, 110B, . . . and the subject changes, the sensors 110A, 110B, . . . corresponding to the edge of the subject generates an event signal, for example. That is, when displacement or rotation occurs in the electronic device 10, the vision sensor 100 also generates an event signal that reflects the displacement or rotation.

Figure 2:
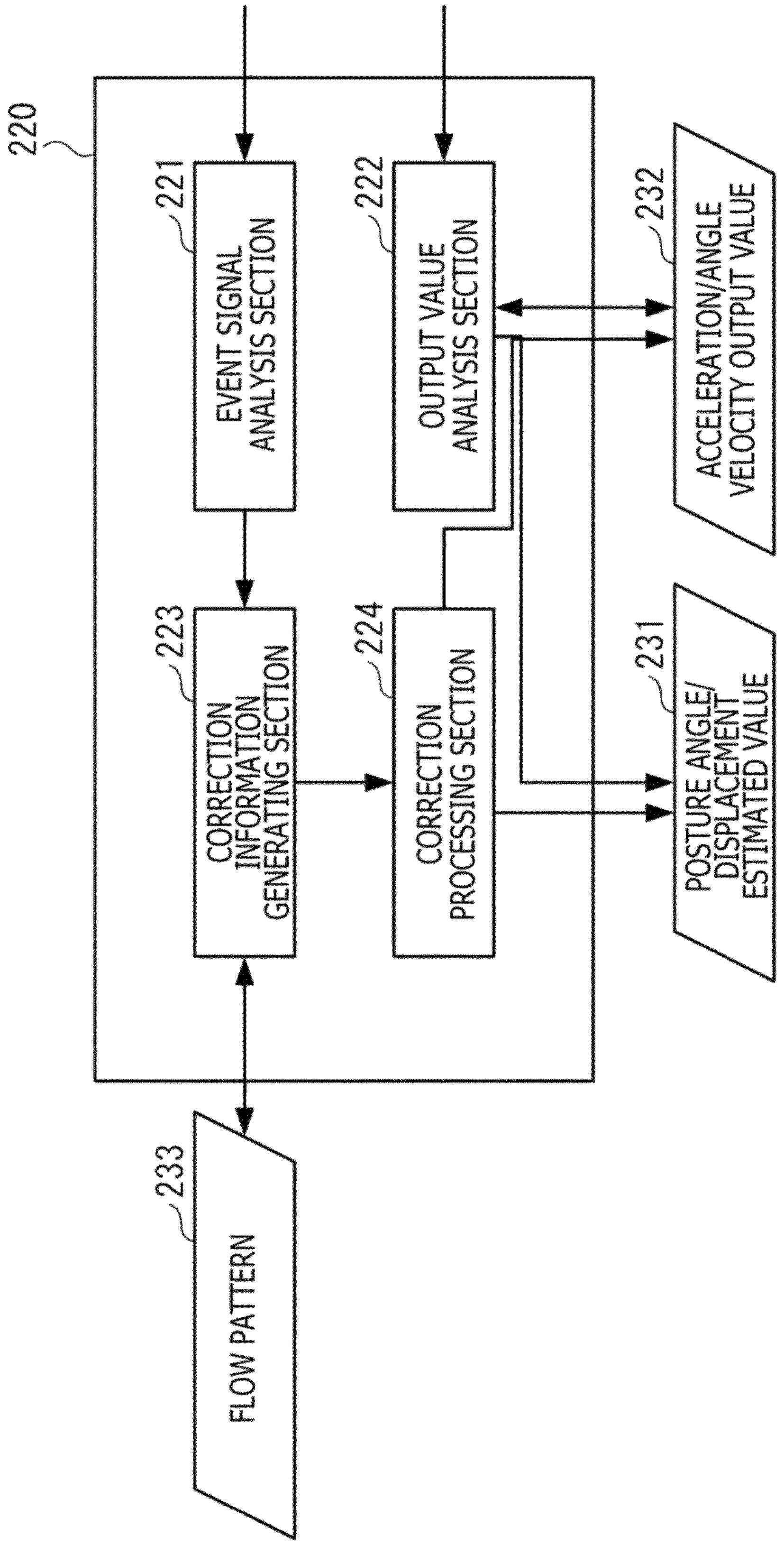
FIG. 2 is a block diagram illustrating a functional configuration of a processing circuit in the electronic device illustrated in FIG. 1.

FIG. 2 is a block diagram illustrating a functional configuration of a processing circuit in the electronic device illustrated in FIG. 1. In the example illustrated in FIG. 2, the processing circuit 220 of the control unit 200 includes an event signal analysis section 221, an output value analysis section 222, a correction information generating section 223, and a correction processing section 224 as functions implemented by the operation according to a program stored in the memory 230, for example. The functions of each section will be described below.

The event signal analysis section 221 analyzes an event signal received from the vision sensor 100 via the communication interface 210. To be specific, for example, the event signal analysis section 221 detects flow information indicating the movement of the subject, by mapping time-series brightness changes indicated by the event signal. Here, the flow information is obtained by representing, by use of vectors, the movement of the subject in each area made by segmenting the pixel area in accordance with a predetermined rule, for example. Although there are no particular limitations regarding the shape or size of the segmented area in which flow information is generated, in the following description, flow information generated in a grid-shaped segmented area containing a predetermined number of pixels in two directions, x and y, may be illustrated.

The output value analysis section 222 analyzes output values such as acceleration and angular velocity received from the IMU 300 via the communication interface 210. To be specific, for example, the output value analysis section 222 calculates the estimated value of the displacement of the electronic device 10 by integrating the acceleration obtained as the output value of the IMU 300. Further, the output value analysis section 222 calculates the estimated value of the posture angle of the electronic device 10 by integrating the angular velocity obtained as the output value of the IMU 300. The calculated estimated values 231 of the displacement and posture angle of the electronic device 10 are stored in the memory 230. Output values 232 of acceleration and angular velocity received from IMU 300 may also be stored in the memory 230.

By associating the flow information detected by the event signal analysis section 221 with a flow pattern 233 prepared in advance, the correction information generating section 223 generates correction information concerning the acceleration and angular velocity in the output values 232 of the IMU 300 acquired in synchronization with the flow information. The flow pattern 233 is stored in the memory 230, for example. It should be noted that, in the following description, the output value 232 acquired in synchronization with flow information means an output value 232 having a time stamp that at least partially corresponds to the event signal on which the flow information is based, for example, and does not necessarily mean that the time when the flow information is detected and the time when the output value 232 is acquired completely match. In the present embodiment, the correction information generating section 223 extracts a flow pattern that matches the flow information as in the example described below, and generates the correction information on the basis of the physical quantities associated with the extracted flow pattern, specifically, acceleration and angular velocity.

Figure 3:
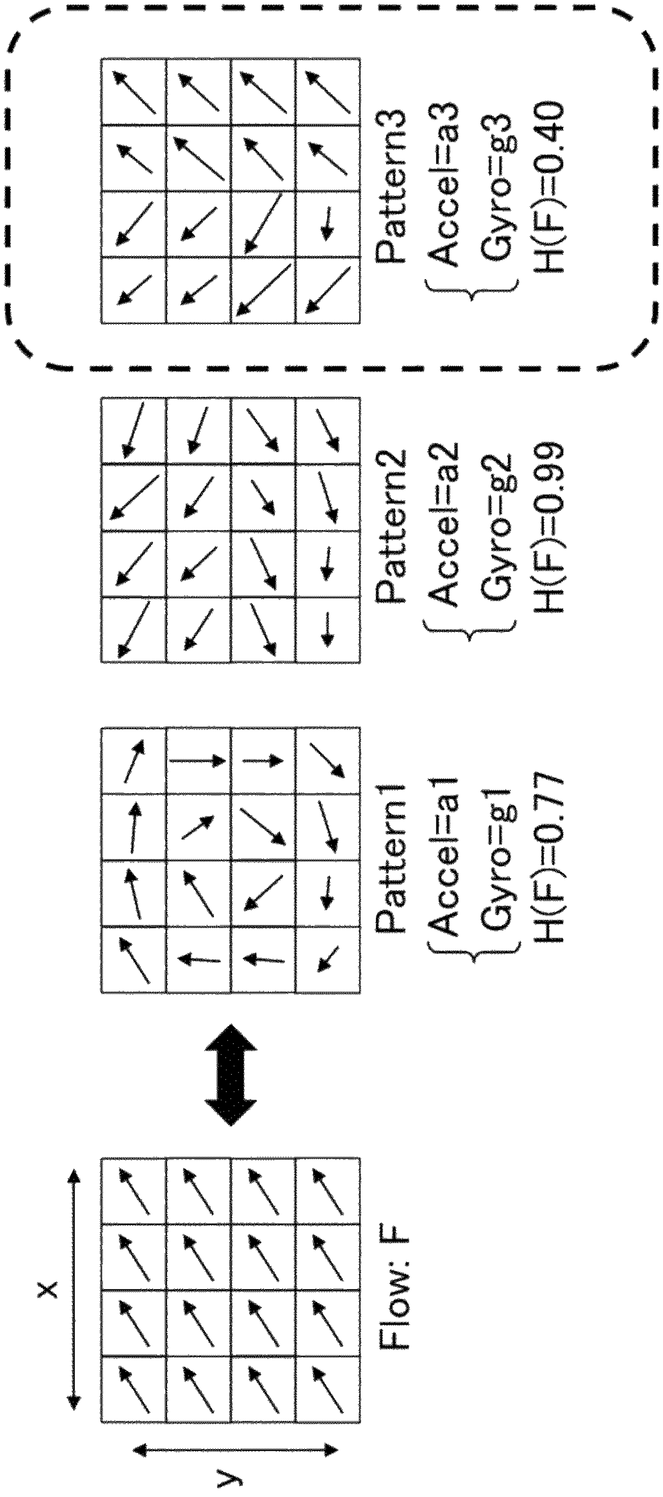
FIG. 3 is a diagram illustrating an example of association between flow information and a flow pattern in the first embodiment of the present invention.

In the example illustrated in FIG. 3, in the flow pattern 233, acceleration (Accel) and angular velocity (Gyro) are associated with the flow pattern on the basis of the results of measurements performed in advance. To be more specific, the flow pattern 233 is generated by, for example, causing displacement and rotation to occur in the electronic device 10 with known acceleration and angular velocity and detecting flow information from an event signal generated by the vision sensor 100 at that time. In a case where the flow information detected by the event signal analysis section 221 matches any of the flow patterns 233, the correction information generating section 223 generates the correction information concerning the acceleration and angular velocity on the basis of the difference between the acceleration and angular velocity associated with the flow pattern 233 and the acceleration and angular velocity in the output value 232. The correction processing section 224 corrects the acceleration and angular velocity in the output value 232 according to the generated correction information.

Here, as in the example illustrated in FIG. 3, whether the flow information F matches the flow pattern 233 may be determined by use of the cost function H(F). In this example, the cost function H(F) indicates the magnitude of the difference between the flow information F and each flow pattern, and the flow pattern with the smaller cost function H(F) is selected. The correction amount of acceleration and angular velocity in the correction information may be set in such a manner as to cause the acceleration and angular velocity in the output value 232 to approach the acceleration and angular velocity associated with the flow pattern 233, at a rate according to the value of the cost function H(F) in the selected flow pattern, for example. In this case, as the value of cost function H(F) becomes smaller, the acceleration and angular velocity in the output value 232 become closer to the acceleration and angular velocity associated with the flow pattern 233.

According to the configuration of the first embodiment of the present invention as described above, by associating in advance the acceleration and angular velocity of the electronic device 10 with the flow information detected from the event signal of the vision sensor 100, the acceleration and angular velocity in the output value of IMU 300 can be corrected on the basis of the flow information to improve accuracy. The correction information concerning the acceleration and angular velocity is an example of additional information related to the output value of the IMU 300, and the correction information generating section 223 is an example of an additional information generating section that generates additional information by associating the flow information detected on the basis of the event signal with the flow pattern.

Second Embodiment

Next, a second embodiment of the present invention will be described. In the present embodiment as well, the functional configurations of the electronic device and the processing circuit are similar to those in the first embodiment. As a difference from the first embodiment, in the present embodiment, the amount of change in velocity, acceleration, or posture angle is associated with the flow information pattern in the flow pattern 233, and the correction information generating section 223 associates the flow information with the flow pattern 233 by using a method different from that in the first embodiment, as in the examples illustrated in FIGS. 4 and 5. In other respects, the configuration of the present embodiment is similar to that of the first embodiment described above, so that a redundant detailed description is omitted.

Figure 4:
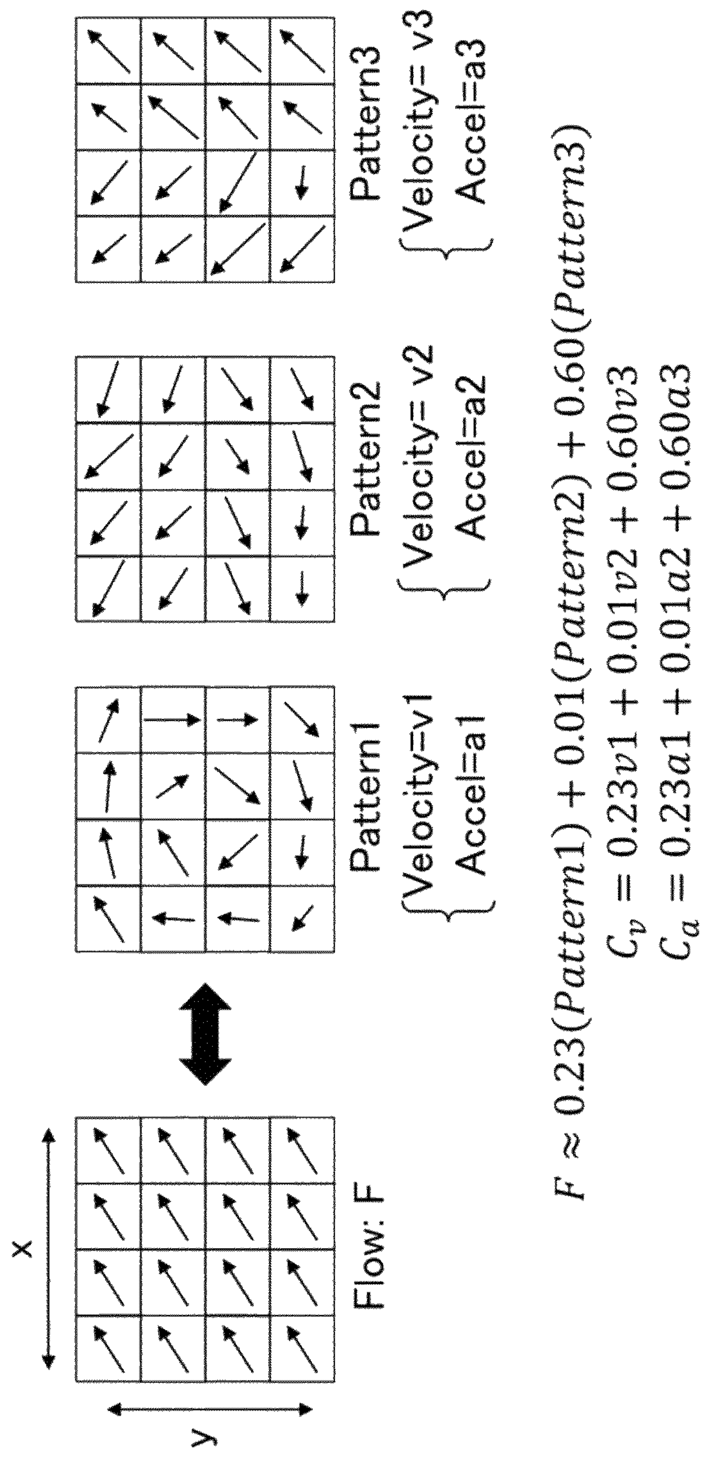
FIG. 4 is a diagram illustrating an example of association between flow information and a flow pattern in a second embodiment of the present invention.
Figure 5:
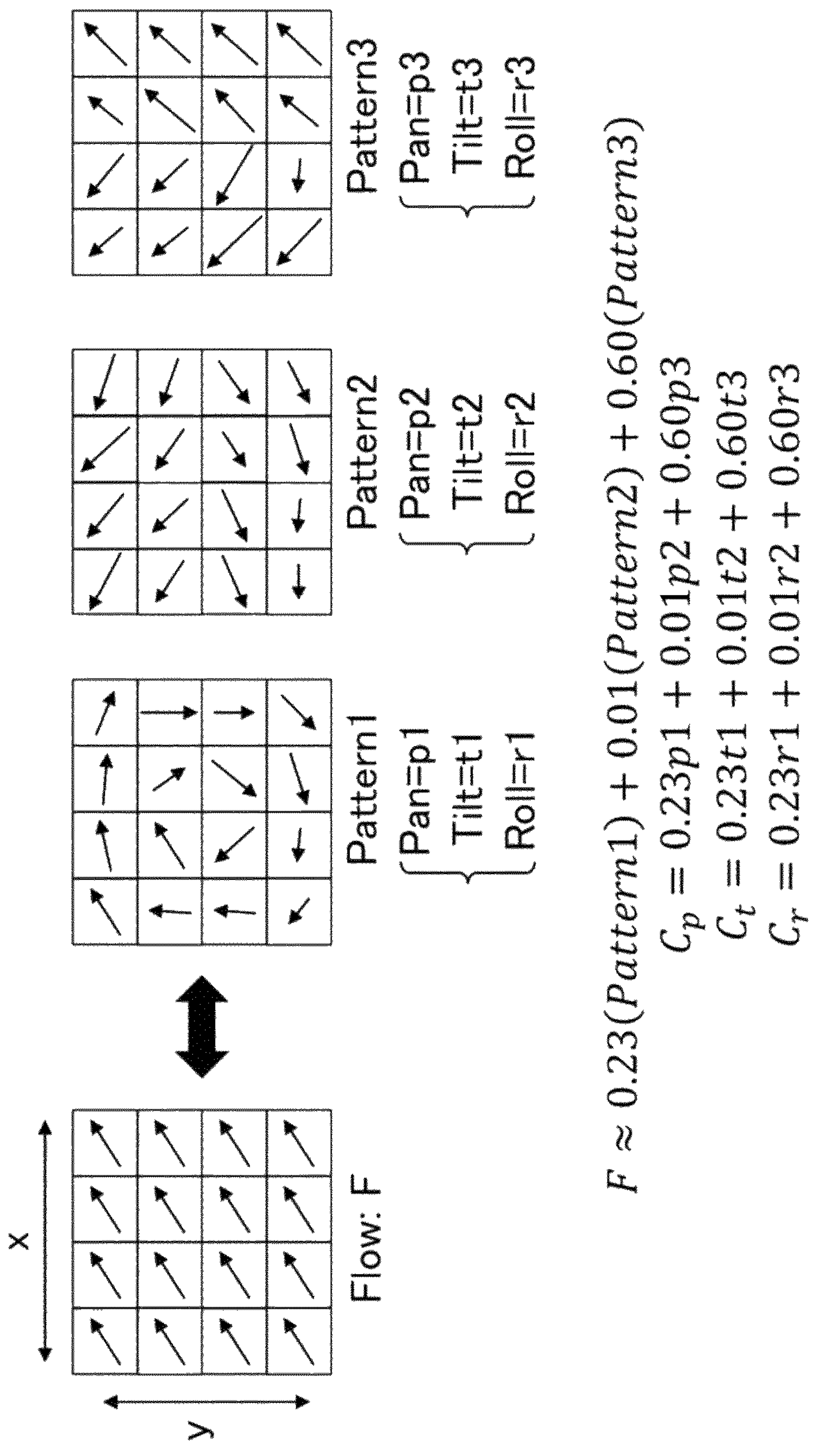
FIG. 5 is a diagram illustrating an example of association between flow information and a flow pattern in the second embodiment of the present invention.

FIG. 4 illustrates examples of flow patterns associated with velocity (Velocity) and acceleration (Accel), and FIG. 5 illustrates an example of flow patterns (Pattern1 to Pattern3) associated with amounts of change of the posture angles (Pan, Tilt, Roll). In the present embodiment, when the electronic device 10 is subjected to displacement with known velocity and acceleration, or rotation with known angular velocity, for example, the flow patterns 233 are generated by detection of flow information from an event signal generated by the vision sensor 100. Incidentally, the velocity and acceleration correction values can be used as correction values when the output value analysis section 222 calculates the estimated value of displacement of the electronic device 10. Further, the posture angle correction value can be used as a correction value when the output value analysis section 222 calculates the estimated value of the posture angle of the electronic device 10.

In the present embodiment, the correction information generating section 223 generates correction information concerning velocity, acceleration, or a posture angle on the basis of the contribution rate of each flow pattern 233 in a case where the flow information F detected by the event signal analysis section 221 is broken down into components of a plurality of flow patterns 233 as in the above example. To be specific, the correction information generating section 223 generates the correction information by adding up the velocity, acceleration, or posture angles respectively associated with the plurality of flow patterns 233, according to the contribution rate of each flow pattern. For example, in the example of FIG. 4, a velocity correction value $C_v$ and an acceleration correction value $C_a$ are calculated as the sum obtained by multiplying velocity v1, velocity v2, and velocity v3 and acceleration a1, acceleration a2, and acceleration a3 associated with the flow patterns by coefficients corresponding to the contribution rates, respectively. Similarly, in the example of FIG. 5, correction values $C_p$, $C_t$, and $C_r$ for the posture angles in respective directions are calculated as the sum obtained by multiplying the posture angles associated with the flow patterns by coefficients corresponding to the contribution rates, respectively. Note that, strictly speaking, what is detected from the flow information F is the amount of change in the posture angle, but, for example, if the time point when the electronic device 10 is determined to be at a standstill, on the basis of the flow signal F, is used as a reference point, the correction value of the posture angle can be calculated by comparing the amount of change in the posture angle detected from the flow information F between the reference points with the amount of change in the posture angle measured by the IMU 300.

According to the configuration of the second embodiment of the present invention as described above, by associating in advance the velocity, acceleration, or posture angle of the electronic device 10 with the flow information detected from the event signal of the vision sensor 100, the posture angle and displacement in the estimated value based on the output value of IMU 300 can be corrected on the basis of the flow information, and accuracy can be improved. The correction information concerning the estimated value of the posture angle and displacement is an example of additional information related to the output value of the IMU 300, and the correction information generating section 223 is an example of an additional information generating section that generates additional information by associating the flow information detected on the basis of the event signal with the flow pattern.

In the second embodiment described above, correction information is generated by adding up values associated with a plurality of flow patterns, according to the contribution rates, and therefore, valid correction information can be generated even in a case where there is no flow pattern with the value of the cost function (H) sufficiently small in the first embodiment, for example. In the case of the first embodiment, as there are more flow patterns to be compared, the possibility of selecting a valid flow pattern becomes higher, but in cases where it is difficult to prepare flow patterns that cover all cases because there are many variations in the movement and environmental conditions of the electronic device 10, for example, the configuration of the second embodiment may be effective.

Third Embodiment

Figure 6:
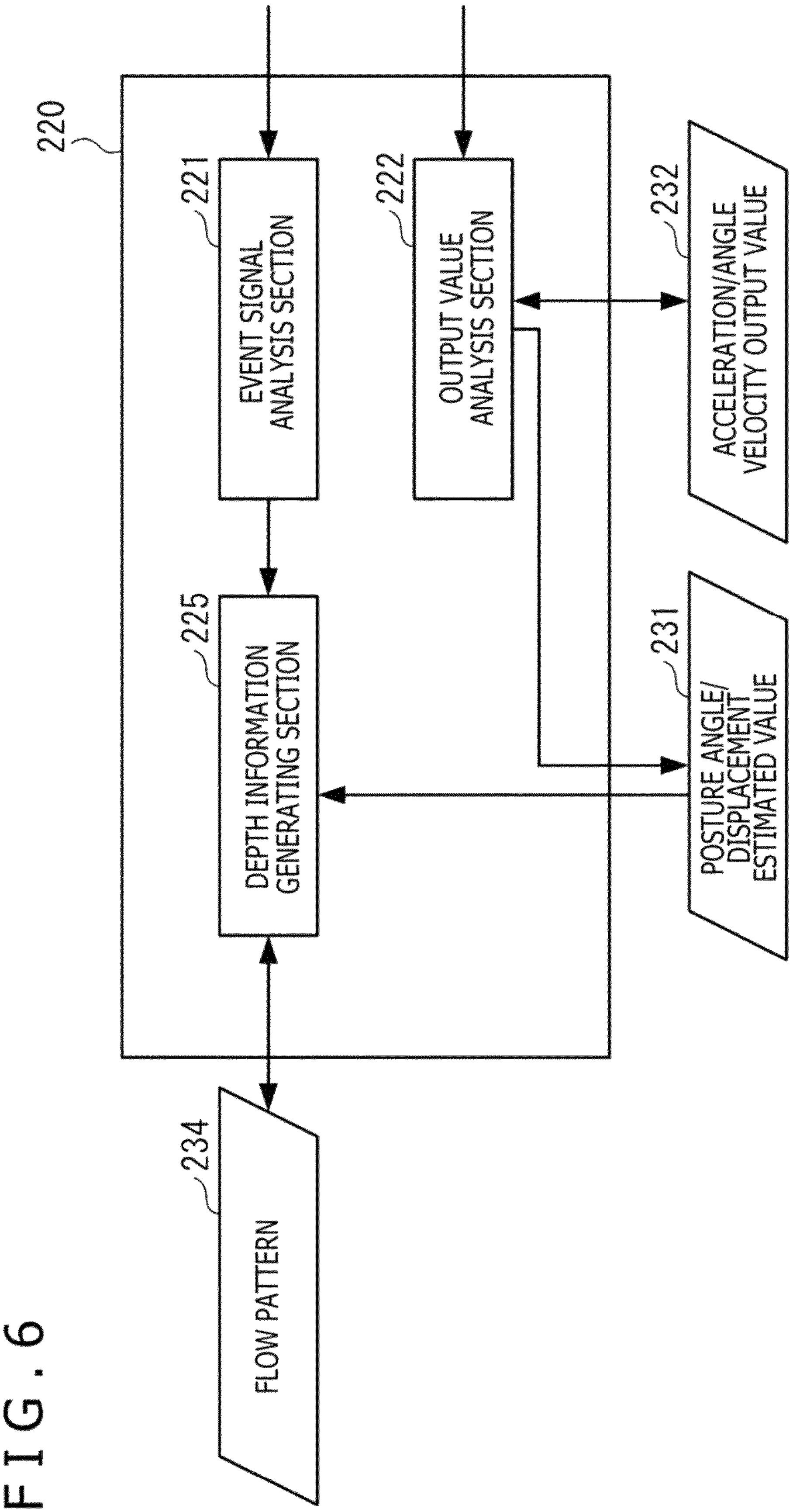
FIG. 6 is a block diagram illustrating a functional configuration of a processing circuit in an electronic device according to a third embodiment of the present invention.

FIG. 6 is a block diagram illustrating a functional configuration of a processing circuit in an electronic device according to a third embodiment of the present invention. In the example illustrated in FIG. 6, the processing circuit 220 of the control unit 200 includes the event signal analysis section 221, the output value analysis section 222, and a depth information generating section 225 as functions implemented by operation according to a program stored in the memory 230, for example. Incidentally, the configuration of the present embodiment other than that of the depth information generating section 225 is similar to that of the first embodiment described above, and therefore, redundant detailed description will be omitted.

Figure 7:
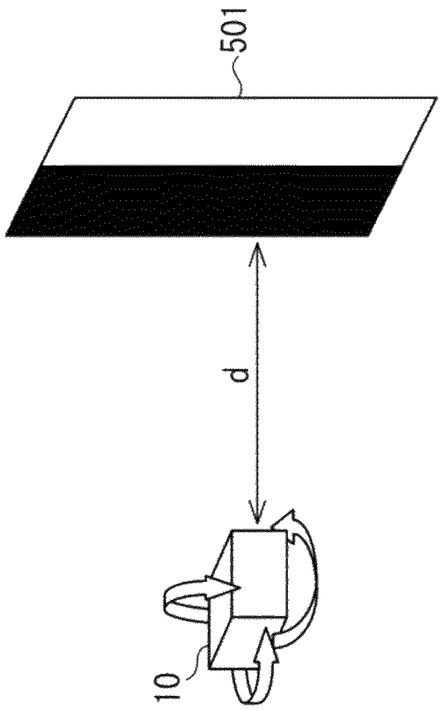
FIG. 7 is a diagram illustrating an example of a flow pattern generation method in the third embodiment of the present invention.

The depth information generating section 225 generates depth information concerning the subject of the vision sensor 100 by associating a flow pattern 234 with the flow information detected by the event signal analysis section 221 and the amount of change in the posture angle of the electronic device 10 based on the output value of the IMU 300 acquired in synchronization with the flow information. In the flow pattern 234, the amount of change in the posture angle and the depth of the subject are associated with the flow pattern on the basis of the results of measurements performed in advance. To be more specific, at the time of causing the electronic device 10 to change its posture angle in a state where a depth d of a subject 501 is known, as in the example illustrated in FIG. 7, the flow pattern 234 is generated by detecting flow information from event signals generated in the vision sensor 100. By detecting flow information while keeping the depth d and causing change in the posture angle with various amounts of change, and further detecting flow information in a similar way while changing the depth d, the flow pattern 234 that can specify the depth d by using the amount of change in the posture angle and the pattern of the flow information as a key can be obtained.

Figure 8:
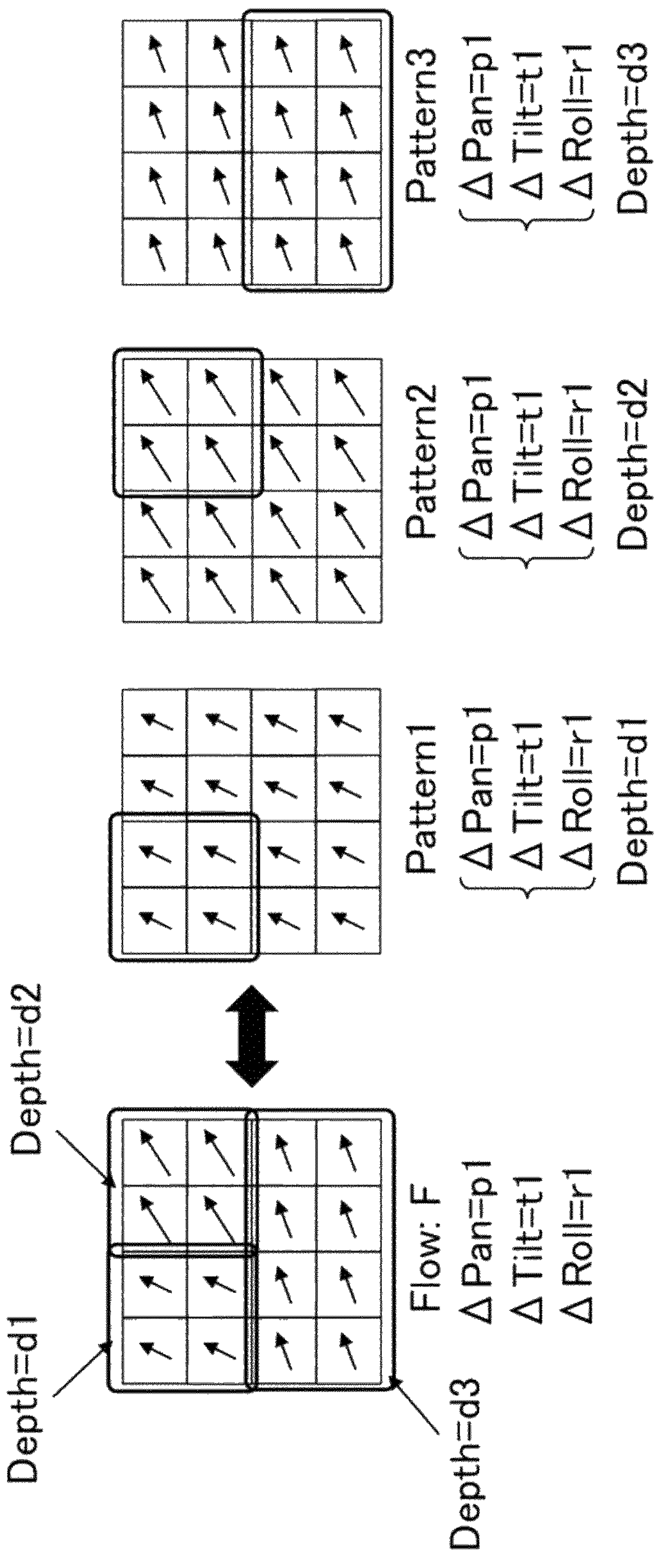
FIG. 8 is a diagram illustrating an example of association between flow information and a flow pattern in the third embodiment of the present invention.

In the present embodiment, the depth information generating section 225 extracts the flow patterns 234 corresponding to the amount of change in the posture angle based on the output value of the IMU 300 acquired in synchronization with the flow information, and identifies patterns which the flow information at least partially matches in the extracted flow patterns 234. In the example illustrated in FIG. 8, flow patterns (Pattern1 to Pattern3) corresponding to the amount of change in the posture angle (ΔPan, ΔTilt, ΔRoll) estimated from the output value of the IMU 300 are extracted, and a pattern matching each of areas obtained by segmenting the flow information F is identified. In the illustrated example, pattern1 (depth d1) is identified in the upper left part of the pixel area, pattern2 (depth d2) is identified in the upper right part of the pixel area, and pattern3 (depth d3) is identified in the lower part of the pixel area as respectively matching patterns. The depth information generating section 225 generates depth information that specifies the depth of the subject in each part of the pixel area, on the basis of the depths d1 to d3 of the subject respectively associated with these flow patterns.

According to the configuration of the third embodiment of the present invention as described above, by associating the depth d of the subject with the flow information in advance for each amount of change in the posture angle of the electronic device 10, the depth information concerning the subject of the event signal can be generated. Note that, since the flow information changes under the influence of both the depth d of the subject and the amount of change in the posture angle of the electronic device 10, the depth of the subject can be more appropriately determined by use of the amount of change in the posture angle estimated from the output value of the IMU 300. The depth information that specifies the depth of a subject is an example of additional information related to an event signal, and the depth information generating section 225 is an example of an additional information generating section that generates additional information by associating flow information detected on the basis of the event signal with the flow pattern.

Although several embodiments of the present invention have been described above in detail with reference to the accompanying drawings, the present invention is not limited to such examples. It is clear that a person with ordinary knowledge in the technical field to which the present invention pertains can come up with various examples of changes or modifications within the scope of the technical idea described in the claims, and it is understood that these also fall within the technical scope of the present invention.

REFERENCE SIGNS LIST

10: Electronic device
100: Vision sensor
110: Sensor array
110A: Sensor
110B: Sensor
120: Processing circuit
200: Control unit
210: Communication interface
220: Processing circuit
221: Event signal analysis section
222: Output value analysis section
223: Correction information generating section
224: Correction processing section
225: Depth information generating section
230: Memory
231: Estimated value
232: Output value
233: Flow pattern
234: Flow pattern
501: Subject

The invention claimed is:

1. An electronic device comprising:

a vision sensor that is an event-driven type sensor that includes a sensor array having a sensor, and that is configured to generate an event signal when detecting a change in an intensity of incident light;

an inertial measurement unit whose positional relation with the vision sensor is known and which is configured to measure at least one physical quantity; and processing circuitry configured to:

generate additional information related to the event signal or an output value of the inertial measurement unit by associating (a) flow information detected on a basis of the event signal with (b) a flow pattern associated in advance with (i) the at least one physical quantity or (ii) an estimated value based on the at least one physical quantity, wherein the additional information includes depth information concerning a subject of the vision sensor, wherein the flow pattern is associated with a depth of the subject in addition to (i) the at least one physical quantity or (ii) the estimated value based on the at least one physical quantity, and wherein generating the additional information comprises:

extracting the flow pattern corresponding to (i) the output value acquired in synchronization with the flow information or (ii) an estimated value based on the output value; and generating the depth information on a basis of the depth of the subject associated with a flow pattern which the flow information at least partially matches in the extracted flow pattern.

2. The electronic device according to claim 1, wherein the event signal generated by the vision sensor indicates at least one of a time stamp of the change in the intensity, sensor identification information indicating a portion of the sensor which detected the change in the intensity, or a polarity of the change in the intensity.

3. The electronic device according to claim 1, wherein the event signal generated by the vision sensor indicates a time stamp of the change in the intensity, sensor identification information indicating a portion of the sensor which detected the change in the intensity, and a polarity of the change in the intensity.

4. The electronic device according to claim 1, wherein the at least one physical quantity measured by the inertial measurement unit includes at least one of acceleration or angular velocity.

5. The electronic device according to claim 1, wherein the at least one physical quantity measured by the inertial measurement unit includes acceleration and angular velocity.

6. The electronic device according to claim 1, wherein the inertial measurement unit includes at least one of a gyro sensor or an acceleration sensor.

7. The electronic device according to claim 1, wherein the inertial measurement unit includes a gyro sensor and an acceleration sensor.

8. The electronic device according to claim 1, wherein the flow information maps time-series brightness changes indicated by the event signal.

9. The electronic device according to claim 1, wherein the processing circuitry is configured to estimate at least one of a displacement of the electronic device or a posture angle of the electronic device based upon the output value of the inertial measurement unit.

10. The electronic device according to claim 1, wherein the processing circuitry is configured to estimate a displacement of the electronic device and a posture angle of the electronic device based upon the output value of the inertial measurement unit.

11. An information processing method comprising:

receiving an event signal from a vision sensor that is an event-driven type sensor, that includes a sensor array having a sensor, and that is configured to generate the event signal when detecting a change in an intensity of incident light;

receiving an output value of an inertial measurement unit whose positional relation with the vision sensor is known; and generating additional information related to the event signal or the output value of the inertial measurement unit by associating (a) flow information detected on a basis of the event signal with (b) a flow pattern associated in advance with (i) at least one physical quantity measured by the inertial measurement unit or (ii) an estimated value based on the at least one physical quantity, wherein the additional information includes depth information concerning a subject of the vision sensor, wherein the flow pattern is associated with a depth of the subject in addition to (i) the at least one physical quantity or (ii) the estimated value based on the at least one physical quantity, and wherein generating the additional information comprises:

extracting the flow pattern corresponding to (i) the output value acquired in synchronization with the flow information or (ii) an estimated value based on the output value; and generating the depth information on a basis of the depth of the subject associated with a flow pattern which the flow information at least partially matches in the extracted flow pattern.

12. A non-transitory computer readable medium storing a program for causing a computer to perform a method, the method comprising:

receiving an event signal from a vision sensor that is an event-driven type sensor, that includes a sensor array having a sensor, and that is configured to generate the event signal when detecting a change in an intensity of incident light;

receiving an output value of an inertial measurement unit whose positional relation with the vision sensor is known; and generating additional information related to the event signal or the output value of the inertial measurement unit by associating (a) flow information detected on a basis of the event signal with (b) a flow pattern associated in advance with (i) at least one physical quantity measured by the inertial measurement unit or (ii) an estimated value based on the at least one physical quantity, wherein the additional information includes depth information concerning a subject of the vision sensor, wherein the flow pattern is associated with a depth of the subject in addition to (i) the at least one physical quantity or (ii) the estimated value based on the at least one physical quantity, and wherein generating the additional information comprises:

extracting the flow pattern corresponding to (i) the output value acquired in synchronization with the flow information or (ii) an estimated value based on the output value; and generating the depth information on a basis of the depth of the subject associated with a flow pattern which the flow information at least partially matches in the extracted flow pattern.

* * * * *